US012562611B2

(12) United States Patent
Sallot et al.

(10) Patent No.: US 12,562,611 B2
(45) Date of Patent: Feb. 24, 2026

(54) ELECTRICAL CONDUCTOR COOLED BY PHASE CHANGE MATERIAL AND METHOD FOR THE MANUFACTURE THEREOF

(71) Applicant: SAFRAN, Paris (FR)

(72) Inventors: Pierre Jean Sallot, Moissy Cramayel (FR); Sabrina Siham Ayat, Moissy Cramayel (FR); Baptiste Joël Christian Fedi, Moissy Cramayel (FR)

(73) Assignee: SAFRAN, Paris (FR)

( * ) Notice: Subject to any disclaimer, the term of this patent is extended or adjusted under 35 U.S.C. 154(b) by 523 days.

(21) Appl. No.: 18/247,051

(22) PCT Filed: Sep. 28, 2021

(86) PCT No.: PCT/FR2021/051672
§ 371 (c)(1),
(2) Date: Mar. 28, 2023

(87) PCT Pub. No.: WO2022/069829
PCT Pub. Date: Apr. 7, 2022

(65) Prior Publication Data
US 2023/0369930 A1 Nov. 16, 2023

(30) Foreign Application Priority Data

Sep. 30, 2020 (FR) ...................................... 2009950

(51) Int. Cl.
*H02K 3/22* (2006.01)
*C25D 3/38* (2006.01)
(Continued)

(52) U.S. Cl.
CPC ................. *H02K 3/22* (2013.01); *C25D 3/38* (2013.01); *C25D 5/48* (2013.01); *C25D 7/0607* (2013.01);
(Continued)

(58) Field of Classification Search
CPC ............. C25D 3/38; C25D 5/48; C25D 13/02
See application file for complete search history.

(56) References Cited

U.S. PATENT DOCUMENTS 5,317,805 A * 6/1994 Hoopman ............... F28F 21/08
257/E23.098
2018/0143673 A1 5/2018 Jenkins et al.
2018/0375402 A1 12/2018 Inamdar

FOREIGN PATENT DOCUMENTS

CN 107025992 A 8/2017
EP 2 840 682 A1 2/2015
(Continued)

OTHER PUBLICATIONS

International Search Report as issued in International Patent Application No. PCT/FR2021/051672, dated Dec. 10, 2021.

*Primary Examiner* — Brian W Cohen
(74) *Attorney, Agent, or Firm* — Pillsbury Winthrop Shaw Pittman LLP

(57) ABSTRACT
A method for manufacturing a conductor of a winding of a coil, includes manufacturing a heat-sink preform including a phase-change material, depositing a conductive element by layer deposition of electrically conductive material on the heat-sink preform, including inserting the heat-sink preform into an electrolytic solution of the electrically conductive material, and; electrodeposition for depositing the electrically conductive material on the heat-sink preform.

11 Claims, 4 Drawing Sheets

(51) Int. Cl.

| | | |
|---|---|---|
| *C25D 5/34* | (2006.01) | |
| *C25D 5/48* | (2006.01) | |
| *C25D 7/06* | (2006.01) | |
| *C25D 13/02* | (2006.01) | |
| *H02K 9/20* | (2006.01) | |

(52) U.S. Cl.

CPC ................. *H02K 9/20* (2013.01); *C25D 5/34* (2013.01); *C25D 13/02* (2013.01)

(56) References Cited

FOREIGN PATENT DOCUMENTS

| | | |
|---|---|---|
| FR | 3 012 698 A1 | 5/2015 |
| FR | 3 019 218 A1 | 10/2015 |
| FR | 3 019 219 A1 | 10/2015 |
| FR | 3 066 053 A1 | 11/2018 |
| WO | WO 2014/100096 A1 | 6/2014 |

* cited by examiner

[Fig. 1]
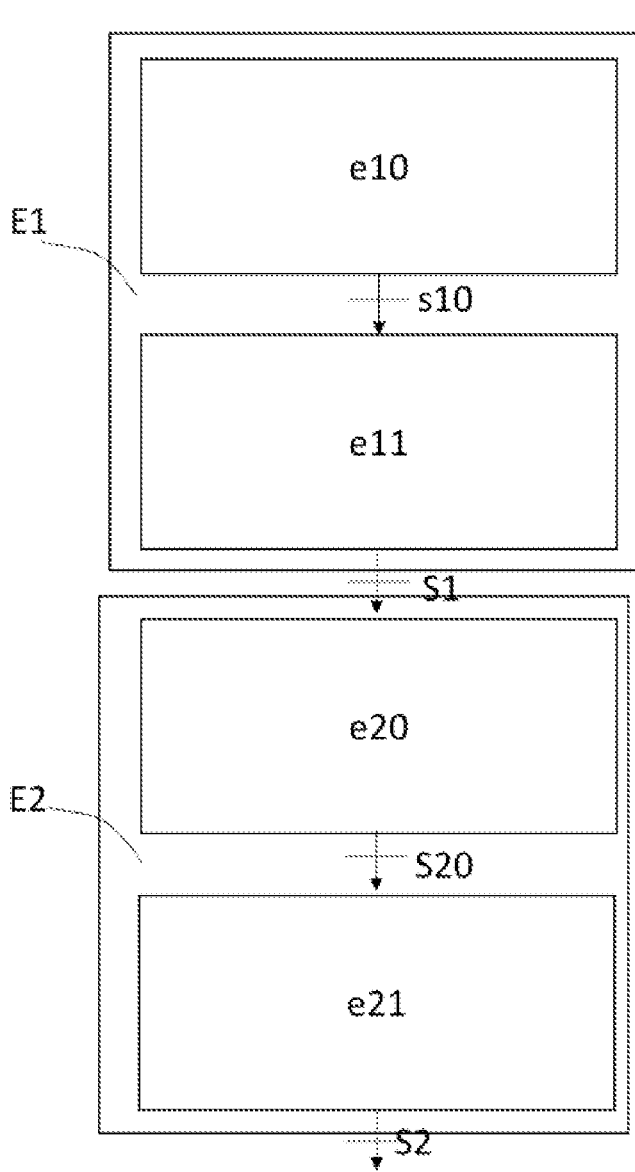

[Fig. 2]
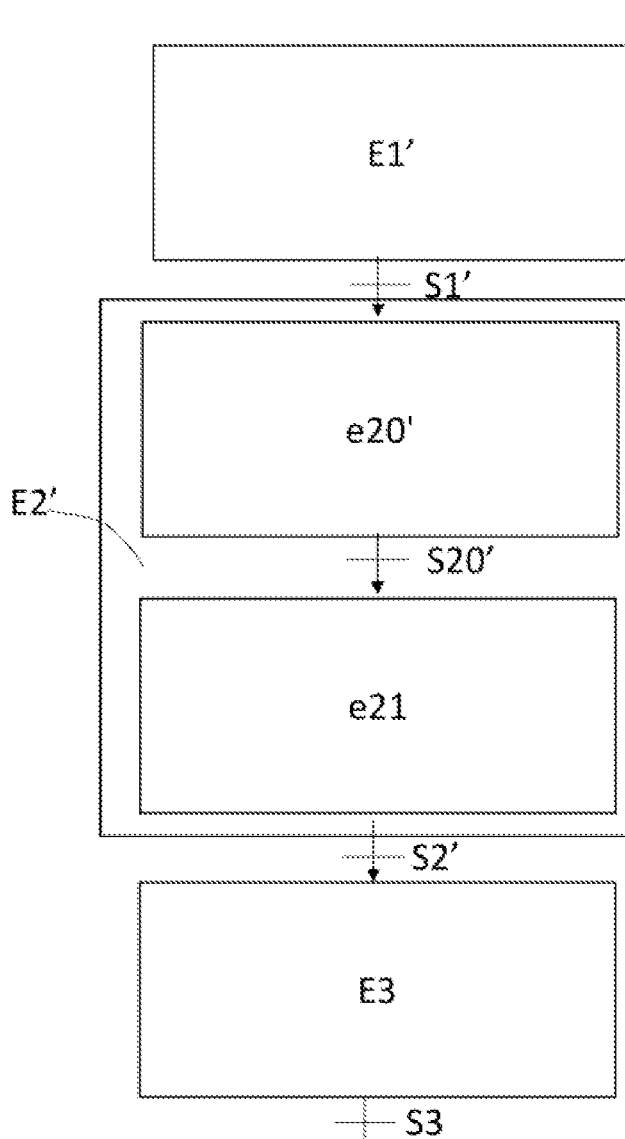

[Fig. 3]
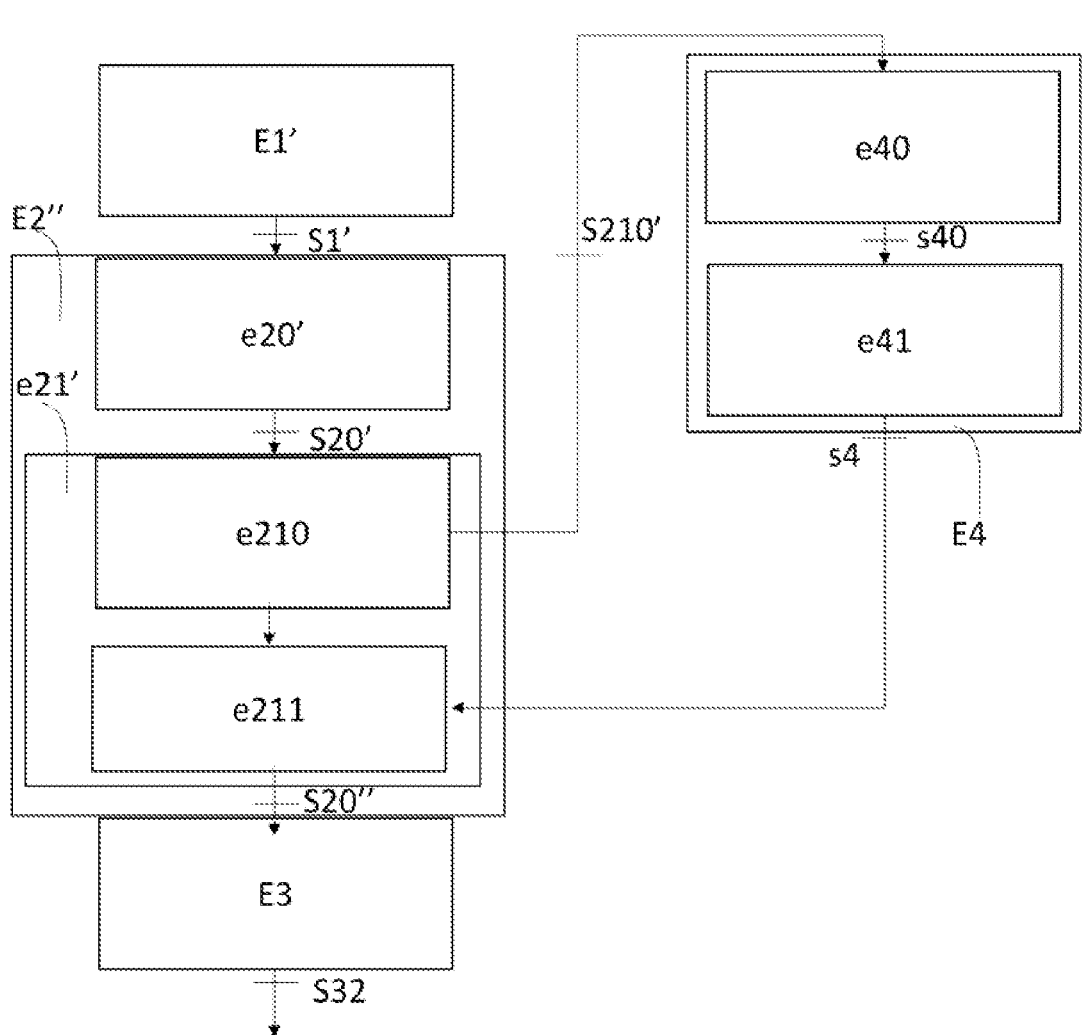

[Fig. 4]
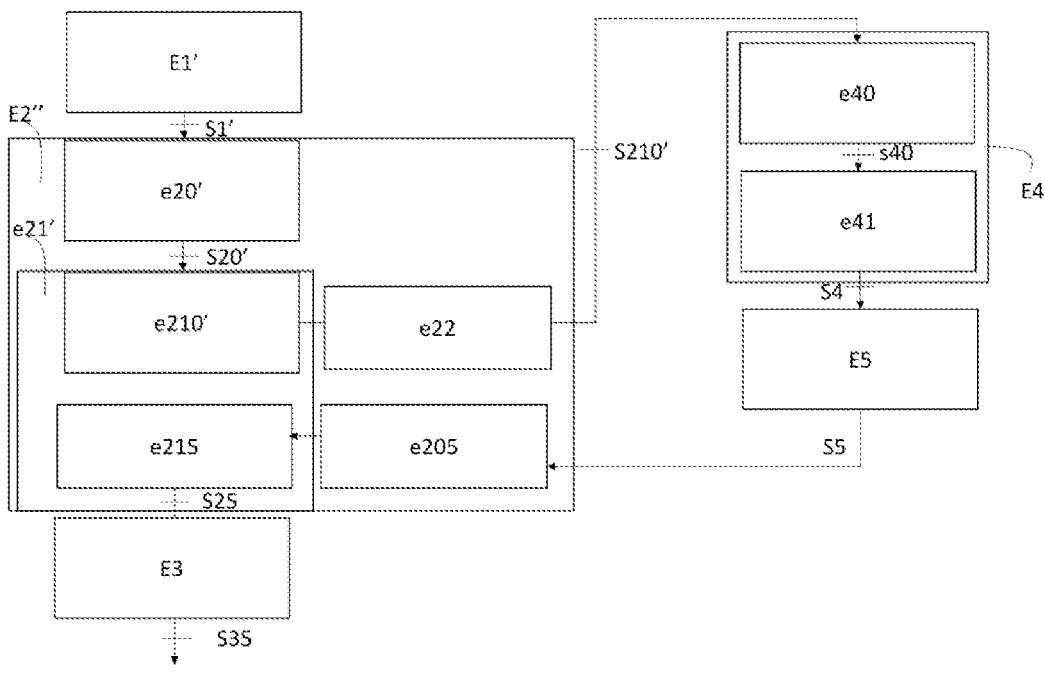

ELECTRICAL CONDUCTOR COOLED BY PHASE CHANGE MATERIAL AND METHOD FOR THE MANUFACTURE THEREOF

CROSS-REFERENCE TO RELATED APPLICATIONS

This application is the U.S. National Stage of PCT/FR2021/051672, filed Sep. 28, 2021, which in turn claims priority to French patent application number 2009950, filed Sep. 30, 2020. The content of these applications are incorporated herein by reference in their entireties.

TECHNICAL FIELD OF THE INVENTION

The technical field of the invention is that of electric conductors for an electric machine cooled by a phase change material, especially for a starter-generator of a turbomachine or a transformer.

The present invention relates to electric conductors of electric machines installed on aircraft engines, in particular those of a helicopter. It particularly relates to electric machines installed on helicopter engines in particular performing the function of generating electric energy, and/or of electric motor-drive for some mechanical members. These electric machines can be starter-generators, starters, alternators or electric pumps which are direct current or alternating current machines.

TECHNOLOGICAL BACKGROUND OF THE INVENTION

An aircraft engine comprises electric machines comprising a rotor (rotating part) and a stator (fixed part), the stator may comprise a magnetic circuit and an electric circuit consisting of a set of coilings comprised of conductive wires. Other types of stators of so-called 'air-cored' machines have a magnetic circuit consisting of air and the electric circuit.

In a known way, such electric machines exhibit transient phases of operation, which are mainly encountered during the starting or acceleration sequences of the aircraft engine or of some equipment that the aircraft engine comprises.

Documents FR3019218 and FR3019219 each describe a helicopter comprising at least one hybrid turboshaft engine capable of operating in at least one standby regime during stabilised flight of the helicopter, the other turboshaft engines operating alone during such stabilised flight. The helicopter further comprises an electrotechnical pack for rapid restarting of said hybrid turboshaft engine to bring it out of said standby regime and reach a so-called nominal regime, in which it provides mechanical power to a power transmission box. These restarts are one example of transient phases requiring high current draw.

During these transient phases, for example rapid restart, the electric machine is thus highly loaded, and therefore dissipates a quantity of heat which may prove harmful to itself, which heat is mainly dissipated in the electric circuits and/or the magnetic circuits if the machine includes them and/or on the permanent magnets if the machine includes them.

Furthermore, the increase in temperature reduces the efficiency of the electric machine due to the fact that the machine increases its electric resistance.

In a known way, to obtain proper power, to favour heat dissipation and thus to ensure integrity of the electric machine, the elements, in particular the electric conductors are oversized to reduce their electric resistance, which compose it, thereby being detrimental to its mass and its overall size.

Indeed, the structure and sizing of an electric machine are guided by its thermal resistance and this is mainly a function of the amplitude of electric currents that it supports within these conductive coilings (for example, an electric machine operating at a low grid voltage of, for example, 28 Vdc, at a power of several kW or kVA will give high intensity electric currents that can reach several hundred amperes).

In order to optimise heat dissipation of the electric machine, several solutions are already known and utilised.

A first solution uses natural convection with cooling by a finned heat sink at the periphery of the electric machine to have a large exchange area with the surrounding environment. However, this solution is of large overall size and massive and often requires the presence of an air flow at the periphery of the machine.

A second solution uses forced convection by adding a fan connected to the rotor shaft of the electric machine, whose air stream thus produced will exchange with the outer and/or inner parts thereof. However, this solution is of large overall size and may generate additional sources of failures.

A third solution uses forced cooling by injecting a liquid circulating in dedicated channels inside the electric machine or at its periphery (water, oil, fuel, etc.) and most often requires the presence of an additional exchanger to ensure cooling of this liquid.

However, this solution is also of large overall size, massive and intrusive, and may require short enough maintenance intervals (i.e. seal management).

This explains why active research is being carried out in order to position devices in the core of coils that can provide direct, continuous or delayed cooling.

A fourth solution uses thermoelectric module cooling (Peltier effect). However, cooling is performed only on discrete zones and also requires a stabilised power supply enabling thermoelectric power supply.

Most of the solutions previously described are effective for continuous cooling of the machine, but do not make it possible to manage high-current transients generating heat peaks. Indeed, for cooling solutions such as forced cooling by injecting a liquid, heat produced in the coils should pass through their varnish, the slot paper, the magnetic yoke before reaching the casing where heat will be discharged by the cooling liquid located in the channels. This induces a response time that is incompatible with thermally restricting transient regimes.

Thus, in an aeronautical application, that is in the context of an on-board system requiring strong restrictions in terms of compactness, mass and reliability, existing solutions are not satisfactory.

From document FR3012698 an electric machine is known comprising at least one heat sink comprising a phase change material so as to dissipate heat during the transient phases of said electric machine, said heat sink being disposed as close as possible to the heat sources involved during said transient phases of said electric machine.

From document FR3066053 an electric machine is further known comprising a coiling of conductor elements and at least one heat sink disposed inside a conductor element, the heat sink comprising a phase change material. Especially it is described that the coiling is a set of hollow cylindrical or bar-shaped wires. The heat sink comprises, further to the phase change materials, at least one element that is electrically conductive so as not to disturb circulation of magnetic field lines in said machine.

The phase change material is capable of changing physical state between the solid state and the liquid state within a given temperature range.

The phase change material is contained within a sealed metal shell, the shell being electrically conductive or non-conductive. The sealed metal shell is thermally conductive.

This phase change material allows for improved cooling of the conductor element. Indeed, the use of phase change materials allows cooling as close as possible to the heating elements. When the phase change material reaches its melting temperature, therefore changing from a solid to a liquid state, it absorbs a quantity of heat. As a result, heat transfer will occur between the heating elements and the phase change material.

However, the manufacture of such conductor elements is complicated to perform. On the one hand, it requires a hollow conductor to be made and on the other hand, the heat sink comprising the phase change material to be arranged inside the conductor. Hollow conductors are known to be manufactured today by wire drawing/extrusion methods. Coils of several kilometres in length can be stored and are currently used for very high voltage machines. However, they have to be filled with the phase change material to ensure cooling function.

Furthermore, the minimum radius of curvature of the conductor thus generated can be increased, which can increase the size of the winding overhangs thereby increasing the mass of the electric machine.

Another example of manufacturing the coiling is indicated in document FR3066053 which specifies that the bar coiling is as a single piece or comprised of a set of unitary bars and is obtained by means of an additive manufacturing method (i.e. SLM type, "Selective Laser Melting" or others . . . ) which allows complex shapes to be made inside the coiling, favouring optimisation of heat transfers (i.e., increased exchange area between the phase change material and the conductor)

Filling is typically done by bringing the phase change material into a liquid phase and then injecting it into the hollow conductor. This filling can be done under vacuum to avoid the formation of air bubbles.

The pressure required to penetrate the phase change material over long distances is too great to be easily achieved industrially, especially for cross-sectional areas of less than 400 mm². Indeed, the smaller the cross-sectional area of the conductor, the greater the pressure drop required to penetrate the phase change material into the conductor, increasing the risk of air bubbles in the hollow conductor.

On the other hand, this hollow conductor technology does not currently allow for a linear change of the cross-sectional geometry.

There is therefore a need to simplify the manufacture of such an electric machine comprising the conductor elements with a heat sink thereinside and especially for conductor elements with a cross-sectional area of less than 400 mm².

SUMMARY OF THE INVENTION

The invention offers a solution to the problems previously discussed, by providing a simple method for industrially producing a coiling conductor comprising the conductor element and the heat sink comprising the phase change material therein.

One aspect of the invention relates to a method for manufacturing a conductor of a winding of a coiling comprising:

a step of manufacturing a heat sink preform comprising a phase change material, a step of depositing a conductor element by depositing layer of electrically conductive material onto the heat sink preform by comprising:

a sub-step of inserting the heat sink preform into an electrolytic solution of the electrically conductive material, an electrodeposition substep for depositing the electrically conductive material onto the heat sink preform.

By virtue of the invention, it is simpler to manufacture a conductor comprising a conductor element and a heat sink comprising a phase change material inside the conductor element which may have a variable linear cross-section. Indeed, manufacturing the conductor element on the heat sink and not inserting the heat sink into the conductor element greatly simplifies the manufacturing method and furthermore allows a conductor element with a more robust manufacturing quality than by inserting the phase change material into a hollow conductor, but also embraces a geometric complexity not achievable with conventional methods. In fact, the phase change material is part of the preform, that is the preform is formed from the phase change material, which means that a hollow preform is no longer filled with an already manufactured wire by a phase change material as in prior art.

By "phase change material", it is meant a material that is capable of changing physical state within a given temperature range and that will absorb a large amount of heat energy from its surrounding environment to change from a solid to a liquid state, and that releases some of the heat energy when the material cools from the liquid to the solid state.

Further to the characteristics just discussed in the preceding paragraph, the method for manufacturing a conductor of a winding of a coiling according to one aspect of the invention may have one or more complementary characteristics from among the following, considered individually or according to any technically possible combinations:

According to one implementation of the method, the electrically conductive material is copper.

According to one implementation of the method, the electrically conductive material is nickel.

According to one implementation of the method, the electrically conductive material is gold.

According to one implementation of the method, the step of manufacturing the conductor element by depositing a layer of electrically conductive material onto the heat sink preform is performed by electroforming.

According to one implementation of the method, the solution is an electrolytic solution of the electrically conductive material.

According to one example, the electrolytic solution of the electrically conductive material has a temperature lower than the phase change temperature of the phase change material. This allows the phase change material preform not to be deformed upon manufacturing the conductor.

According to one implementation of the method, the step of manufacturing a heat sink preform comprising a phase change material comprises a sub-step of machining the phase change material.

According to an implementation other than the previous one, the step of manufacturing a heat sink preform comprising a phase change material comprises a sub-step of plastic injection or moulding or extrusion of the phase change material.

According to one alternative to the other two preceding implementations, the step of manufacturing a heat sink preform comprising a phase change material comprises a sub-step of additively manufacturing the phase change material.

According to one example of one of these implementations of the method wherein the step of manufacturing a heat sink preform comprises an additive manufacturing or casting or machining sub-step to provide the heat sink preform with an irregular cross-section. This can allow a coiling to have less material in the winding head or overhang of a stator. The restriction of conventional conductors in terms of radius of curvature results in an increase in the size of the winding overhangs, and therefore the weight of the machine. The winding overhangs do not participate in the creation of torque in the machine, so having a heat sink preform with an irregular cross-section can make available a shape to limit the size of this region. According to one example, the cross-section of the conductor may vary with the length of the conductor. For example, the conductor has portions for the winding overhangs having different cross-sectional shapes than the portions for the active parts but without reducing the cross-sectional area of the conductors at the winding overhangs so as not to increase Joule losses.

According to one example, the step of manufacturing the heat sink preform forms a plurality of portions having a cross-section in a first shape and a plurality of second portions in a second shape different from the first shape and in that the step of depositing the conductive material onto the preform forms a conductor having first portions each having a cross-section with a shape different from a cross-section with a shape of a plurality of second portions of the conductor. According to one example the first cross-section has a shape to perfectly fit the shape (for example rectangular) of the bottom of a slot of a stator or rotor and the second cross-section has a shape to perfectly fit the shape of the slot between the first section and the tooth gap (inlet port) of the slot. This increases the filling rate of the conductor into the slot. For example, the first cross-sections have a rectangular shape with a wider base than the second cross-sections when the slot is open towards the stator or rotor axis.

According to one implementation, the heat sink preform comprises only the phase change material or the phase change material metallised by a chemical metallisation operation.

According to one implementation of the method, the method further comprises a phase change material volume adjustment step comprising:

a sub-step of changing phase from the solid phase to the liquid phase of the phase change material and a sub-step of discharging the volume of the phase change material through at least one end generated by thermal expansions of the phase change material.

Therefore, this avoids overpressure in the conductor element which may lead to extensions of the conductor.

According to one example of this implementation of the method, the phase change is achieved by a thermal cycle further enabling the thermal properties of the phase change material to be stabilised.

According to one implementation of the method, the method further comprises a step of enclosing the phase change material.

According to one example of this implementation, the step of enclosing the phase change material comprises a step of electrophoretically deposition of a layer of electric insulator which is of type AlN, Boron Nanotubes, BN or Alumina onto the layer of conductive material deposited onto the preform and at the ends to close the conductor.

According to one example of this implementation, the step of enclosing the phase change material comprises a substep of inserting a plug at both ends of the conductor. This prevents the phase change material from leaving the conductor element.

According to one feature of this example of this implementation of the method, each plug includes the circuitry necessary to supply the coil of the coiling. This avoids the need to further add circuitry to the plug.

According to one feature of this example of implementation, the plug insertion substep is performed on a conductor preform comprising the heat sink preform and a copper layer on the heat sink preform forming part of the conductor element during the conductor element layer deposition step.

According to one example of this feature, the step of enclosing the heat sink phase change material comprises:

a substep of inserting plug onto a conductor preform comprising the heat sink preform and a copper layer on the heat sink preform forming a part of the conductor element during the conductor element layer deposition step.

For example, the deposition step includes:

a substep of removing a conductor preform from the electrolytic solution of the electrically conductive material, the conductor preform comprising the heat sink preform and a layer of the conductive material on the heat sink preform forming a part of the conductor element, a sub-step of inserting a conductor preform with the plugs into the electrolytic solution of the electrically conductive material, a second electrodeposition sub-step for depositing the electrically conductive material onto the conductor preform and the plugs, and in that the step of enclosing the phase change material of the heat sink includes the substep of inserting plug onto the conductor preform between the removal substep and the second insertion substep.

This allows for a conductor element to be further formed on the plug allowing for better conductivity and better sealing.

According to a combination of this example of this implementation and the implementation of the method further comprising the phase change material volume adjustment step previously described, the phase change material volume adjustment step is performed prior to the sub-step of inserting plug onto the conductor preform.

For example, the phase change material volume adjustment step is performed between the removal substep and the insertion substep.

According to one alternative of this example of this implementation, the step of enclosing the phase change material is performed by adding the conductor element onto the heat sink preform.

According to one implementation of the method, the heat sink preform is a cable.

According to one example of this implementation of the method, the cable is cylindrical in cross-section.

According to another example of this implementation of the method, the cable is rectangular or square in cross-section. This improves the conductor filling rate of the coil, especially in the case of a slot of a stator of an electric machine.

According to one implementation of the method, the step of manufacturing a heat sink preform comprises a first sub-step of manufacturing a preform of phase change material and a second, chemical metallisation sub-step, for example chemical deposition of copper or silver onto the preform of phase change material.

According to a combination of this implementation and the implementation of the method, the method further comprises the step of adjusting the volume of phase change material previously described.

According to one implementation of the method, the phase change material is in the solid phase at room temperature.

According to one implementation of the method, the phase change material has a melting temperature of greater than one hundred degrees Celsius. This allows water to be used as the electrolytic solution of the conductive material and the electrodeposition to be carried out without changing phase of the phase change material from a solid phase to a liquid phase, while still being able to boil the water.

According to one implementation of the method, the phase change material has a latent heat of fusion greater than one hundred and twenty kilojoules per kilogram.

According to one implementation of the method, the phase change material is selected from a fatty acid (for example iron fumarate) or a hydrated salt (for example $MgCl_2 6H_2O$) or an organic material (for example benzamide, stilbene, benzoic acid, methylene xylene, catechol, quinone, acetanilide, sulphur dioxide, etc. (except paraffin)). These phase change materials have the advantage of being able to have the characteristics of the three previous implementations.

According to one alternative to the previous implementation of the method, the phase change material is chosen from an organic and inorganic eutectic (for example, $LiNO_3 + NH_4NO_3 + NH_4Cl$) or metal materials (for example, the eutectic Bi—Pb). These materials allow the advantage of having at least one characteristic among the three modes of implementation before the previous implementation.

According to one implementation, the phase change material is with endothermic phase change.

According to one implementation, the method comprises an insulation step, comprising a sub-step of electrophoretically deposition of an insulating layer which is of type of AlN, Boron Nanotubes, BN or Alumina onto the layer of conductive material deposited onto the preform. This makes it possible to perform insulation of the turns. The insulation step may be performed after the conductor is closed or may be performed on the opening performing closure of the conductor.

Another aspect of the invention relates to a coiling comprising at least one winding comprising a conductor manufactured according to the method of the invention previously described with or without one or more of the characteristics of the implementations previously described. The coiling may have a plurality of windings, for example three, in the case of a three-phase or six in the case of a double three-phase and each winding may have several conductors.

According to one example, the manufactured conductor comprises an insulating layer which may be made by electrophoretically deposition of an electrically insulating and thermally conductive ceramic (AlN, BN, boron nanotubes, alumina, . . . ).

Another aspect of the invention relates to an electric machine comprising the coiling according to the aspect of the invention previously described.

According to one example the insulation by insulating layer of a conductor insulation step is carried out before inserting the coiling into the motor.

Another aspect of the invention relates to a hybrid turbomachine comprising the electric machine according to the aspect of the invention previously described.

A further aspect of the invention relates to a helicopter comprising a hybrid turbomachine comprising an electric machine according to the aspect of the invention previously described.

The invention and its different applications will be better understood upon reading the following description and upon examining the accompanying figures.

BRIEF DESCRIPTION OF THE FIGURES

The figures are set forth by way of indicating and are in no way limiting purposes of the invention.

FIG. 1 represents a flow diagram of a grafcet of a method for manufacturing a conductor according to a first implementation.

FIG. 2 represents a block diagram of a grafcet of a method for manufacturing a conductor according to a second implementation.

FIG. 3 represents a block diagram of a grafcet of a method for manufacturing a conductor according to a third implementation.

FIG. 4 represents a block diagram of a grafcet of a method for manufacturing a conductor according to a fourth implementation.

DETAILED DESCRIPTION

The figures are set forth by way of indicating and in no way limiting purposes of the invention.

FIG. 1 represents a flow diagram of a grafcet of a first implementation of a method for manufacturing a bare conductor S2 of a winding of a coiling comprising a conductor element and a heat sink comprising the phase change material inside the conductor element.

In the application, by "conductor element", it is meant the main electrically conductive part of the conductor.

As used in the application, by "heat sink", it is meant the part of the conductor for cooling the conductor element.

As used in the application, by "phase change material", it is meant a material that is capable of changing physical state within a given temperature range and that will absorb a large amount of heat energy from its surrounding environment to change from a solid to a liquid state, and that releases some of the heat energy as the material cools from the liquid to the solid state.

The method comprises a step of manufacturing E1 a heat sink preform S1 comprising a phase change material.

The conductive phase change material may be either electrically conductive metal, for example a eutectic bismuth-lead alloy, or conductive non-metal, for example in the form of a salt such as iron fumarate, or it may be, for example, a hydrated salt such as nitrates or hydroxides ($LiNO_3$, $NaNO_3$, $Li_2CO_3$ etc.) preferably with graphite.

In this first implementation, the conductive phase change material is non-conductive and the step of manufacturing E1 a heat sink preform S1 comprises a first sub-step of manufacturing e10 a phase change material preform s10.

The first sub-step of manufacturing e10 the phase change material preform s10 may be carried out by an additive method or moulding or machining. According to one example of this first implementation, the first sub-step of manufacturing e10 the phase change material preform s10 is arranged to make a phase change material preform with an irregular cross-section.

This allows the heat sink preform to have an irregular cross-section and thus a conductor with an irregular cross-section. This may allow a coiling to have less material in the winding head or overhang of a stator. Indeed, the restriction of conventional conductors in terms of radius of curvature results in an increase in the size of the winding overhangs, and therefore the weight of the machine. The winding overhangs do not participate in the creation of torque in the machine, so having a heat sink preform with an irregular cross-section can have a shape to limit the size of this region. According to one example, the cross-section of the conductor may vary with the length of the conductor. For example, the conductor has portions with different cross-sectional shapes for the winding overhangs than those of the portions for the active parts, but without reducing the cross-sectional area of the conductors at the winding overhangs so as not to increase Joule losses.

The step of manufacturing a heat sink preform S1 further comprises a second chemical metallisation sub-step e11, for example chemical deposition of copper or silver, onto the phase change material preform s10 to form the heat sink preform S1.

The method further comprises a step of depositing E2 a conductor element by depositing layer of electrically conductive material onto the heat sink preform. The electrically conductive material is copper in this example.

The deposition step E2 comprises a first sub-step of inserting e20 the heat sink preform S1 into an electrolytic solution of the electrically conductive material S20' and a second electrodeposition sub-step e21 for depositing the electrically conductive material onto the heat sink preform. The electrolytic solution may be an acidic copper sulphate solution for example.

The electrodeposition substep e21 may be an electroforming step.

When the electrodeposition substep e21 has deposited enough conductive material onto the heat sink preform, for example until a predetermined cross-sectional area, for example a cross-sectional area of the conductor assembly equal to 200 mm$^2$, the bare conductor S2 is formed and can be removed from the electrolytic solution of the electrically conductive material S20.

The method according to this example of this first implementation may further comprise an insulation step comprising adding an insulating resin to the bare conductor S2 by, for example, bathing the bare conductor S2 in an insulating resin bath to impregnate and insulate it and thereby form an insulating conductor.

For example, the insulation step comprises a step of electrophoretically deposition of an insulating layer which is of type of AlN, Boron Nanotubes, BN or Alumina for the insulation of turns. The insulating layer can be made by electrophoretic deposition of an electrically insulating and thermally conductive ceramic (AlN, BN, boron nanotubes, alumina etc.). This insulation step is carried out before the coiling is inserted into the motor.

FIG. 2 represents a schematic diagram of a grafcet of a method for manufacturing an insulating conductor S3 of a winding of a coiling according to a second implementation.

This method is identical to the first manufacturing method except that the phase change material is conductive metal, for example a eutectic bismuth-lead alloy, and therefore the step of manufacturing E1' a heat sink preform S1 comprising a phase change material is different in that it does not include a chemical metallisation sub-step e11. Of course, the method may include this metallisation step to increase conductivity.

In this second implementation, the step E1' of manufacturing a heat sink preform S1' can be carried out by an additive method or moulding or machining or by extrusion. Herein, in this example, the conductor S3 is a cable with a regular cross-sectional area of, for example, 300 mm$^2$ and the step of manufacturing E1' a heat sink preform S1' is carried out by extrusion of the conductive metal phase change material directly forming the heat sink preform S1'.

The step of depositing E2' a conductor element by depositing a layer of electrically conductive material onto the heat sink preform S1' may be performed in an identical manner to the depositing step E2 of the first implementation. The bare conductor S2' is formed and can be removed from the electrolytic solution of the electrically conductive material S20 when the cross-sectional area of the conductor assembly equals 300 mm$^2$.

The bare conductor S2' may further be impregnated with an insulating resin. Herein, in this example, the method of this first implementation may further comprise an insulation step E3 comprising adding an insulating resin to the bare conductor S2' by, for example, bathing the bare conductor S2' in an insulating resin bath to impregnate and insulate it and thereby form an insulating conductor S3.

According to one example of the first, second implementation, the method comprises a step of enclosing the phase change material comprising a substep of inserting a plug at the end of the preform comprising an expansion chamber facing the phase change material to allow the phase change material to expand into this chamber upon its first phase change from solid to liquid phase. The enclosing step may be performed between the preform manufacture step E1, E1' and the conductor element deposition step E2, E2', or after the conductor element deposition step E2, E2', by cutting off at least one end of the bare conductor or during the deposition step E2, E2', E2" as, for example, in a fourth implementation described later without or with an adjustment step described later.

FIG. 3 represents a block diagram of a grafcet of a method for manufacturing a conductor S32 of a winding of a coiling according to one example of a third implementation.

This method comprises a step of manufacturing E1' a heat sink preform S1' identical to that of the second implementation and further comprises a sub-step e210 of electrodepositing the heat sink preform, a second sub-step e211 of electrodepositing a conductor preform S4 adjusted and further a step E4 of adjusting a volume of phase change material S4 of the conductor preform S4 adjusted during the first electrodeposition sub-step e210 by electrolysis.

According to another example of this third implementation, not represented, the step of manufacturing a heat sink preform is identical to that of the first implementation.

The step of depositing E2" a conductor element by depositing a layer of electrically conductive material onto the heat sink preform S1' comprises, in an identical manner to the second implementation, the first sub-step of inserting e20' the heat sink preform in an electrolytic solution of the electrically conductive material.

The step of adjusting E4 the volume of phase change material S4 comprises a substep of changing phase e40 from the solid phase to the liquid phase S40 of the phase change material and a substep of discharging e41 the volume of the phase change material through at least one end generated by thermal expansions of the phase change material until the volume of the phase change material reaches a predetermined volume in the adjusted conductive preform S4.

In this example, in order to perform the adjustment step E4, it is necessary for a conductor preform S210' comprising the heat sink preform S1' and a part of the conductor element surrounding the heat sink preform S1', to be sufficiently covered with the conductive material by the electrodeposition substep e21' to be sealed in order to perform the adjustment step E4.

In this example of this third implementation, the adjustment step E4 is performed during the electrodeposition substep e21', for example by covering the ends of the conductive preform S210', cutting at least one of the sealed ends to open the ends of the conductive preform, and raising the temperature of the solution to the melting temperature of the phase change material to perform the phase change step s40 and then the step of discharging e41 a part of the phase change material up to the predetermined volume.

In this example, when the conductor preform is adjusted S4, the ends of the conductor preform including the predetermined volume of phase change material S4 are reinserted into the electrolytic solution and the electrodeposition substep e21' by electrolysis comprises a second electrodeposition step e211' continuing the addition of the conductor material onto the conductor preform S4 until there is a bare conductor S20'' comprising the predetermined cross-sectional area, for example 400 mm$^2$ and thus comprising the predetermined volume of phase change material.

According to another example not represented, the conductor preform S210' is removed, the adjustment step E4 is performed, and the conductor preform with the predetermined volume S4 is reintegrated into the solution to perform the last second electrodeposition step e211'. This example makes it possible to have a uniform conductor since the electrolysis of the conductor preform S210' is stopped during the adjustment step E4 whereas in the example represented, the part of the preform S210' immersed in the solution continues to be electrolysed and thus to have an addition of conductive material.

According to one alternative not represented, the method performs the adjustment step E4 on the bare conductor, and further comprises a step of enclosing the conductive material by inserting at least one plug onto the open end (by cutting off the end of the conductor preform S210'). The plug may be sealed by welding or soldering for example.

The method may include an insulation step E3 as in the previous embodiments by impregnating the bare conductor S20'' in an insulating resin bath and thus emerging an insulated conductor S32.

FIG. 4 represents a schematic diagram of a method for manufacturing a conductor S35 of a winding of a coiling according to one example of a fourth implementation.

This method comprises a step of manufacturing E1' a heat sink preform S1' identical to that of the method of the third implementation and a step of depositing E2'' a conductor element by depositing a layer of electrically conductive material onto the heat sink preform S1', which is different from this third implementation in that it further comprises a sub-step of removing e22 the conductor preform S210' from the electrolytic solution of the electrically conductive material and a second sub-step of inserting 205 a conductor preform S5 having plug into the solution and in that the method further includes a step of adjusting E4 the volume of phase change material S4 and a step of enclosing E5 this phase change material performed between the removal sub-step e22 and the second insertion step e205.

In this fourth implementation, the method thus comprises after the electrodeposition sub-step e210 until the deposition of electric conductor onto the heat sink preform seals it forming a conductor preform S210' as in the third implementation, a step of removing e22 the conductor preform S210' from the solution.

The method further includes an adjustment step e4 comprising a sub-step of changing phase e40 from the solid phase to the liquid phase S40 but unlike the third implementation, this sub-step is performed outside the electrolytic solution. The adjustment step e4 comprises, as in the third implementation, a sub-step of discharging e41 the volume of the phase change material through at least one end generated by thermal expansions of the phase change material until the volume of the phase change material reaches a predetermined volume in the conductive preform S4 adjusted.

Then, the method of this fourth implementation comprises a step of enclosing E5 the phase change material of at least the open end for the adjustment step E4. Herein, in this example of this implementation, the step of enclosing E5 the phase change material comprises a sub-step of inserting plug at both ends of the conductor preform S4. In particular, according to this example, each plug comprises the circuitry necessary to supply the coil of the coiling.

The method then comprises the second sub-step of inserting 205 the conductor preform S5 comprising the plugs and the sub-step of electrodepositing the conductor preform S5 by electrolysis.

Unless otherwise specified, a same element appearing in different figures has a single reference.

The invention claimed is:

1. A method for manufacturing a conductor for a winding of coil comprising:
   manufacturing a heat sink preform comprising a phase change material, wherein the heat sink preform is a cable, and
   depositing a conductor element by depositing a layer of electrically conductive material onto the heat sink preform by:
   inserting the heat sink preform into an electrolytic solution of the electrically conductive material,
   carrying out an electrodeposition for depositing the electrically conductive material onto the heat sink preform to form the conductor.

2. The method of claim 1, wherein the electrically conductive material is copper.

3. The method of claim 1,
   wherein the manufacturing of the heat sink preform forms a plurality of portions having a cross-section in a first shape and a plurality of second portions in a second shape different from the first shape and
   wherein the depositing of the conductive material onto the preform forms a conductor having first portions each having a cross-section with a shape different from a cross-section shape of a plurality of second portions of the conductor.

4. The method of claim 1, further comprising:
   adjusting a volume of the phase change material of the conductor or of the heat sink preform with a conductive material deposited thereon comprising:
   changing phase from a solid phase to a liquid phase of the phase change material, and
   discharging the volume of the phase change material through at least one end of the conductor or the heat sink preform with the conductive material deposited thereon,
   enclosing the phase change material of the conductor or the heat sink preform with the conductive material deposited thereon, and performing an insulation step comprising a sub-step of electrophoretically deposition of an electric insulator layer, which is of the type of aluminum nitride, Boron Nanotubes, boron nitride or Alumina, onto the conductive material.

5. The method of claim 1, further comprising enclosing the phase change material of the conductor comprising a substep of inserting plug into at least one end of the conductor or of the heat sink preform with the conductive material deposited thereon.

6. The method of claim 5, wherein each plug comprises circuitry.

7. The method of claim 5, further comprising manufacturing the conductor by depositing a layer of electrically conductive material onto the heat sink preform further comprises:

removing the heat sink preform with the conductive material deposited thereon from the electrolytic solution of the electrically conductive material, and reinserting the heat sink preform with the conductive material deposited thereon with the plugs into the electrolytic solution of the electrically conductive material, performing a second electrodeposition step of depositing the electrically conductive material onto the heat sink preform with the conductive material thereon and the plugs, wherein the inserting of the plug onto the heat sink preform with the conductive material deposited thereon is performed after the removing and before the reinserting.

8. The method of claim 1, wherein the heat sink preform is made by an additive method in order to have a conductor with an irregular cross-section.

9. The method of claim 1, wherein manufacturing a heat sink preform comprises a chemical metallization sub-step onto the phase change material.

10. The of claim 9, wherein the chemical metallization sub-step is a chemical deposition of copper or silver.

11. The method of claim 7, further comprising:

an insulation step after the manufacturing of the conductor, the insulation step comprising a sub-step of electrophoretically deposition of an insulating layer onto the conductor, wherein the insulating layer comprises aluminum nitride, boron nanotubes, boron nitride or alumina.

* * * * *